May 23, 1967      J. R. GRIFFITH      3,321,101
FILAMENT-WOUND HOLLOW CYLINDRICAL ARTICLES
Filed Aug. 13, 1964
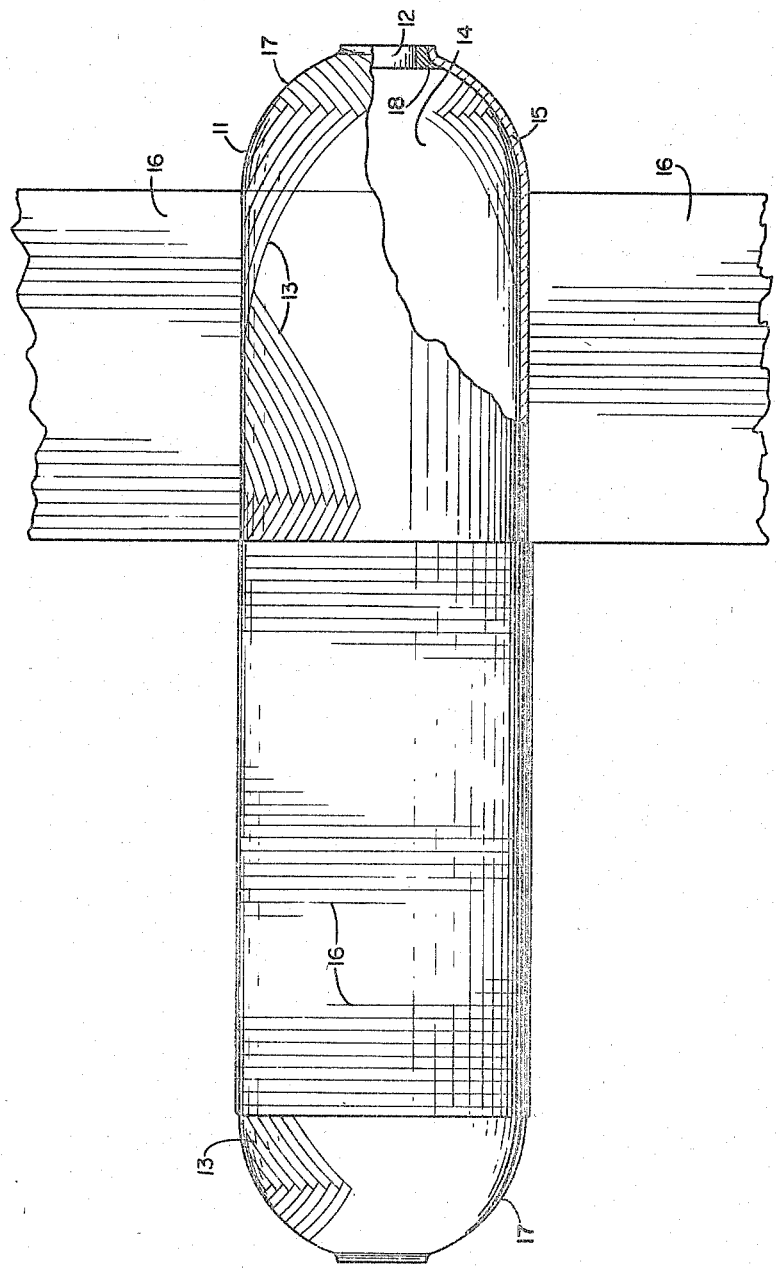
INVENTOR
JAMES R. GRIFFITH

United States Patent Office 3,321,101
Patented May 23, 1967

3,321,101
FILAMENT-WOUND HOLLOW CYLINDRICAL
ARTICLES
James R. Griffith, Riverdale Heights, Md., assignor to the
United States of America as represented by the Secretary of the Navy
Filed Aug. 13, 1964, Ser. No. 389,505
5 Claims. (Cl. 220—3)

The invention described herein may be manufactured and used by or for the Government of the United States of America for governmental purposes without the payment to any royalties thereon or therefor.

This invention relates to filament-wound casings for use in missile or rocket motors. More particularly, the invention relates to plastic-bonded filament structures capable of withstanding greater stresses without deformation or destruction.

Filament winding is a process by which strands of materials (threads of spun glass or other fibers) are wound on a form or mandrel in a continuous web and shaped into suitable cylindrical tubes or vessels. The web is coated or impregnated with a thermosetting binder that sets and hardens to form a rigidly bonded structure.

A casing or vessel formed by the filament winding process, mentioned above, exhibits desirable structural properties and is particularly well-suited for rocket motors and missiles in that it is both lightweight and strong. The strength of the casing depends to a large extent on the fiber content which accounts roughly for about 70% to 80% by volume of the fibrous-bonded composition. Glass fiber with a tensile strength of about 300,000 p.s.i. forms an excellent filamentary material for winding a cylindrical vessel or casing designed with rounded ends, said casing being substantially of a one-piece construction without seams, welds or joined sections.

Of particular significance for the filament-wound casing of the present invention is the ability of the fiber glass structure to withstand increasing internal pressures that develop during the burning of rocket propellants. This further increase in structural strength is now attributed to the filament-winding resin that binds the individual fibers together into a unified solid structure.

A filament-winding resin is, in a broad sense, any bonding system which is capable of binding thread-like units to form a wound structure. Epoxide resins have been employed previously in wound structures, but the cured epoxide-amine plastic of the prior art is aptly described as a hard and brittle solid as compared to the present resin plastic which is considerably tougher and less likely to fracture or snap when subjected to any pressure or strain.

A more effective epoxy resin plastic, which is now utilized in the improved filament-wound casings of the present invention, is described in detail and forms the subject matter of applicant's copending application, Ser. No. 389,504, filed on even date herewith. In said copending application, there is disclosed a curable composition formed by mixing together in equivalent amounts the diepoxide, diglycidyl ether of bisphenol A

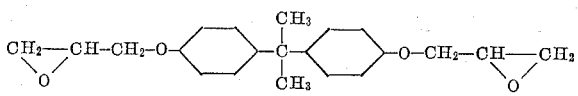

with the reactant, meta-aminobenzylamine

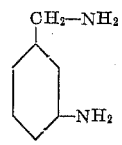

the mixture forming a liquid system which hardens at room temperature of about 70° F. and is then heat-cured, partially at a lower temperature of about 150° F. and then to completion at a temperature of about 250° F.

The plastic composition disclosed in said copending application is capable of absorbing greater compressional and impact forces without rupturing. It is also an excellent bonding agent that softens at low temperature and joins together to form a continuous mass; it can be cured with a good degree of control to produce a firm, durable bond. The disclosure in said copending application is intended to be considered as incorporated in the present disclosure for purposes of detailed description.

An object of the present invention is to provide filament-wound motor casings or vessels with improved structural strength as measured by their ability to withstand higher internal pressures.

Another object of the invention is to provide a novel plastic-bonded fiber structure which is more resistant to compressive loads, internal combustion and craze cracking.

A further object of the invention is to provide an improved rocket motor casing having higher strength-to-weight ratio than previous motor casings.

Still other objects and advantages will be realized from the following description of the invention.

The above objects are accomplished according to the invention by an improved filament-wound casing comprising a continuous filament or strand of glass fibers wound on a mandrel in a definite pattern and bonded with a resin plastic. The plastic is used to saturate the wound structure with an amount that will bind the fibers and fill the interstices between adjacent fibers. The resin plastic consists essentially of the reaction mixture of meta-amino-benzylamine and diglycidyl ether of bisphenol A. The solid formed in the reaction is cured at temperatures in the range of 100° F. to 250° F.

In a preferred embodiment of the invention, filament-winding assumes a criss-cross pattern on a cylindrical surface, the fibers running at some acute angle to the longitudinal axis. The fiber band is laid down adjacent to the preceding strand running in the same direction, crosses over the end of the cylinder and returns at the same acute angle to the longitudinal axis in the reverse direction. The bands are thus continued around the cylinder covering its entire surface.

The invention may best be understood with reference to the accompanying drawing wherein the figure is a somewhat schematic illustration of a filament-wound casing, partly cut away and peeled back to indicate the internal structure.

Referring now to the figure, a hollow cylindrical casing 11 comprises a continuous filament 13 of glass, quartz or other fibrous material wound in a criss-cross manner across the ends of said casing forming rounded end surfaces 17. The casing is shown with an opening 12 in each end fitted with an annular ring 18 although this particular feature is a matter of design and is not relied upon for patentable distinction. The fiber bands are laid down at some acute angle to the horizontal axis, each band of fibers being laid adjacent to the preceding strand which is running in the same direction to form the entire cylindrical surface layer. Any desired number of fiber layers may be formed in this criss-cross manner to provide any specified fiber thickness 15. The hollow interior is shown at 14. The cylindrical structure has helical windings 16 wound over said criss-crossing layers to reinforce the cylindrical girth. The internal pressure on a cylindrical wall is not uniform as in a sphere, the stress on the cylindrical wall is greater than along the longitudinal axis, and therefore the cylindrical wall should be reinforced with additional windings to equalize the structural strength throughout the casing wall.

The term "fibers" as used in the specification is intended to refer to individual filaments as well as to discrete bundles of filaments often described as strands. A number of strands which are wound together are referred to as a band of fibers.

The filament-wound casing described above is formed with the liquid resin applied as a coating on the fibers, the mixture of diglycidyl ether of bisphenol A and meta-aminobenzylamine remaining a liquid during the entire winding process. The mixture will remain liquid for considerable time even after the filament winding has been completed, in which case it is preferable that the wet structure be spun continuously until the resin plastic has completely solidified. The epoxy resin is cured at a temperature of about 100° F. to 150° F. for an hour or so and then cured to completion at a temperature of about 250° F. for three hours. The formed filament wound structure may contain from about 20 to 30% by volume of the fully cured epoxy resin.

The improvement of the present filament-wound casing over previous fiber casings may be demonstrated by the amount of pressure which may be applied internally on the cylindrical surface before the casing will burst. The test apparatus involves a pressurized hydraulic system which exerts pressure on the inner surface of the casing. A rubber tube, of approximately the same shape and inner dimensions as those of the casing, is connected to a high pressure line and inserted into the casing. The hydraulic fluid is then permitted to fill the rubber tube, exerting an increasing pressure on the inner surface of the casing. A pressure indicator records the actual pressure applied until the fibrous-resin structure bursts. The present casing can withstand pressures in the range of 1850–1950 p.s.i., the average internal pressure being approximately 1905 p.s.i.

The casings which were used for test purposes as disclosed herein had a wall thickness of 40 mils and a cylindrical diameter of 5 inches. The strand of fibers was made up of 204 filaments with a filament diameter of about 2 mil. The type of fiber glass used in fabricating the test casings was designated as "E"-glass with the "HTS" finish. The fiber band which was wound into the cylinder was made up of 30 strands. These specific dimensions and glass quality are stated to provide complete test data, but they are not intended as limitations for the filament-wound casings and vessels of the present invention. Fibers which may be used for the present wound structures may have a diameter in the range of 0.01 to 0.00001 inch.

Prior art casings constructed in similar manner and tested according to the test method described above, can withstand internal pressures of about 1750 to 1850 p.s.i. Epoxy resin systems of the prior art which employ the diglycidyl ether of bisphenol A are reacted conventionally with meta-phenylene diamine to form the resin plastic. Casings bonded with this epoxy-amine system have optimum values near 1850 p.s.i. On examination of bursted casings, the present bonding agent is capable of retaining bonded fiber layers in depth, whereas prior art casings after bursting generally indicate complete disarray in the top layers. The bonding strength of the resin plastic in the present structure is indicated where the winding pattern is preserved over a larger area.

The foregoing detailed description has been given for purposes of illustration and is not intended to limit the scope of the invention. On the contrary, the scope of the invention is to be determined from the appended claims.

What is claimed and desired to be secured by Letters Patent of the United States is:

1. A filament-wound hollow article having a curved wall formed substantially of fiber windings and an epoxide resin which is the fully cured reaction product of equivalent amounts of the diglycidyl ether in bisphenol A and meta-aminobenzylamine, said epoxide resin being coated on and bonding said fiber windings together.

2. A filament-wound hollow article as defined in claim 1, wherein said fiber windings are glass fiber windings.

3. A filament-wound hollow article having a cylindrical wall formed substantially of glass fiber windings and an epoxide resin which is the fully cured reaction product of equivalent amount of the diglycidyl ether of bisphenol A and meta-aminobenzylamine, said epoxide resin being coated on and bonding said fiber windings together.

4. A filament-wound hollow article as defined in claim 3, wherein said glass fiber windings include overlying criss-cross wound layers in which the glass fibers are arranged at an acute angle to the longitudinal axis of said cylindrical wall.

5. A filament-wound tubular casing comprising:
a cylinder having integral rounded ends and an axially arranged opening in each of said ends,
said cylinder and integral rounded ends being formed substantially of glass fiber windings and an epoxide resin which is the fully cured reaction product of equivalent amounts of the diglycidyl ether of bisphenol A and meta-aminobenzylamine,
said epoxide resin being coated on and bonding said fiber windings together,
said fiber windings including overlying criss-cross windings in which the glass fibers are arranged at an acute angle to the longitudinal axis of said cylinder and adjacent the fiber winding crossing in the same direction and
helical windings overlying said criss-cross windings at the girth of said cylinder.

References Cited by the Examiner

UNITED STATES PATENTS

| | | | |
|---|---|---|---|
| 2,643,239 | 6/1953 | Shokal et al. | 161—184 X |
| 2,717,885 | 9/1955 | Greenlee | 260—47 |
| 2,843,153 | 7/1958 | Young | 220—3 |
| 2,848,133 | 8/1958 | Ramberg | 220—3 |
| 2,945,638 | 7/1960 | Crawford et al. | 161—184 |
| 2,957,794 | 10/1960 | Shetterly et al. | 161—184 |
| 2,981,701 | 4/1961 | St. Clair et al. | 260—47 X |
| 2,995,011 | 8/1961 | Kimmel | 220—83 |
| 3,010,045 | 11/1961 | Plagg et al. | 161 |
| 3,047,191 | 7/1962 | Young | 220—3 |
| 3,083,864 | 4/1963 | Young | 220—83 |
| 3,112,234 | 11/1963 | Krupp | 220—3 |
| 3,144,952 | 8/1964 | Uhlig et al. | 220—3 |
| 3,210,228 | 10/1965 | Bluck | 220—3 X |

EARL M. BERGERT, *Primary Examiner.*

RAPHAEL N. SCHWARTZ, *Examiner.*

H. ANSHER, *Assistant Examiner.*